(12) United States Patent
Xiu et al.

(10) Patent No.: US 11,587,056 B2
(45) Date of Patent: Feb. 21, 2023

(54) DATA INTERACTION METHOD AND DEVICE, AND OFFLINE CREDIT PAYMENT METHOD AND DEVICE

(71) Applicant: Advanced New Technologies Co., Ltd., Grand Cayman (KY)

(72) Inventors: Chao Xiu, Hangzhou (CN); Lei Wang, Hangzhou (CN); Yingde Liu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 321 days.

(21) Appl. No.: 16/026,776

(22) Filed: Jul. 3, 2018

(65) Prior Publication Data

US 2018/0330354 A1    Nov. 15, 2018

Related U.S. Application Data

(63) Continuation of application No. PCT/CN2016/112264, filed on Dec. 27, 2016.

(30) Foreign Application Priority Data

Jan. 5, 2016  (CN) .......................... 201610006675.6

(51) Int. Cl.
*G06Q 20/24*  (2012.01)
*G06Q 20/20*  (2012.01)
(Continued)

(52) U.S. Cl.
CPC ............. *G06Q 20/24* (2013.01); *G06Q 20/08* (2013.01); *G06Q 20/20* (2013.01);
(Continued)

(58) Field of Classification Search
CPC ........ G06Q 20/20; G06Q 20/02; G06Q 20/24; G06Q 20/3274; G06Q 20/3829;
(Continued)

(56) References Cited

U.S. PATENT DOCUMENTS 8,694,438 B1 * 4/2014 Jernigan .............. G06Q 20/204
705/67
8,769,279 B2 * 7/2014 von Mueller ...... G06Q 20/3829
713/168
(Continued)

FOREIGN PATENT DOCUMENTS

CN    1599921    3/2005
CN    103489098    1/2014
(Continued)

OTHER PUBLICATIONS

PCT International Preliminary Report on Patentability in International Application No. PCT/CN2016/112264, dated Jul. 10, 2018, 8 pages (with English translation).
(Continued)

*Primary Examiner* — Peter Ludwig
*Assistant Examiner* — Avia Salman
(74) *Attorney, Agent, or Firm* — Fish & Richardson P.C.

(57) ABSTRACT

Implementations of the present application provide data interaction and offline credit payment methods and devices. In one implementation, a credit payment code generated by a server is obtained by scanning and parsing a two-dimensional code presented on a mobile computing device for making a payment. The credit payment code is then decrypted based on asymmetric key decryption to obtain a credit payment token. The credit payment token is parsed to obtain security content included in the credit payment token. The payment associated with the credit payment code is then determined to satisfy the security content and the payment is verified with the server that generates the credit payment code at a predetermined time.

20 Claims, 16 Drawing Sheets

Collect authorization data for current interaction obtained by an intelligent terminal from a remote server — *101*

Record the authorization data and data of the current interaction — *102*

(51) Int. Cl.
*G06Q 20/38* (2012.01)
*G06Q 20/08* (2012.01)
*G06Q 20/32* (2012.01)
*G06Q 20/40* (2012.01)
*G06Q 20/36* (2012.01)

(52) U.S. Cl.
CPC ..... *G06Q 20/3274* (2013.01); *G06Q 20/3276* (2013.01); *G06Q 20/3278* (2013.01); *G06Q 20/3674* (2013.01); *G06Q 20/3829* (2013.01); *G06Q 20/401* (2013.01); *G06Q 20/403* (2013.01); *G06Q 20/409* (2013.01); *G06Q 20/4093* (2013.01)

(58) Field of Classification Search
CPC ............. G06Q 20/401; G06Q 30/0238; G06Q 30/0268; G07B 2017/00225; G07F 7/088; G07F 7/0886; G07G 1/0009
See application file for complete search history.

(56) References Cited

U.S. PATENT DOCUMENTS

| | | | | |
|---|---|---|---|---|
| 9,135,615 | B1* | 9/2015 | Mutha | G06Q 20/12 |
| 9,262,771 | B1* | 2/2016 | Patel | G06Q 30/0237 |
| 2008/0223918 | A1* | 9/2008 | Williams | G06Q 20/20 |
| | | | | 235/379 |
| 2012/0130866 | A1* | 5/2012 | Cooke | G06Q 30/0643 |
| | | | | 705/27.2 |
| 2012/0130888 | A1* | 5/2012 | Cooke | G06Q 20/3272 |
| | | | | 705/39 |
| 2012/0130889 | A1* | 5/2012 | Lyons | G06Q 20/3272 |
| | | | | 705/39 |
| 2013/0041831 | A1* | 2/2013 | Das | G06Q 20/20 |
| | | | | 705/72 |
| 2013/0066749 | A1* | 3/2013 | Cooke | G06Q 30/0643 |
| | | | | 705/27.2 |
| 2014/0279554 | A1* | 9/2014 | Priebatsch | G06Q 20/385 |
| | | | | 705/67 |
| 2014/0289107 | A1* | 9/2014 | Moshal | G06Q 20/3255 |
| | | | | 705/40 |
| 2015/0006386 | A1* | 1/2015 | Tebbe | G06Q 20/326 |
| | | | | 705/44 |
| 2015/0066778 | A1* | 3/2015 | Jang | G06Q 20/385 |
| | | | | 705/71 |
| 2015/0170130 | A1* | 6/2015 | Patel | G06Q 20/3821 |
| | | | | 705/17 |
| 2015/0170131 | A1* | 6/2015 | Patel | G06Q 20/326 |
| | | | | 705/44 |
| 2015/0170132 | A1* | 6/2015 | Patel | G06Q 20/3226 |
| | | | | 705/44 |
| 2015/0248664 | A1* | 9/2015 | Makhdumi | G06Q 20/3274 |
| | | | | 235/380 |
| 2016/0065370 | A1* | 3/2016 | Le Saint | H04L 9/14 |
| | | | | 713/155 |
| 2016/0217464 | A1* | 7/2016 | Jajara | G06Q 20/322 |
| 2016/0224977 | A1* | 8/2016 | Sabba | G06Q 20/385 |
| 2016/0253651 | A1* | 9/2016 | Park | G07F 9/023 |
| | | | | 705/39 |
| 2016/0253652 | A1* | 9/2016 | Je | G06Q 20/321 |
| | | | | 705/39 |
| 2016/0253669 | A1* | 9/2016 | Yoon | G06Q 20/327 |
| | | | | 705/75 |
| 2016/0253670 | A1* | 9/2016 | Kim | G06Q 20/38 |
| | | | | 705/72 |
| 2016/0328692 | A1* | 11/2016 | Camps | G06Q 20/385 |
| 2017/0032370 | A1* | 2/2017 | Beltramino | G06Q 20/38215 |
| 2017/0061419 | A1* | 3/2017 | Kim | G06Q 20/102 |
| 2017/0068953 | A1* | 3/2017 | Kim | G06Q 20/382 |
| 2017/0132633 | A1* | 5/2017 | Whitehouse | G06Q 20/4014 |
| 2017/0161706 | A1* | 6/2017 | Patel | G06Q 20/201 |
| 2018/0330354 | A1* | 11/2018 | Xiu | G06Q 20/401 |
| 2019/0333034 | A1* | 10/2019 | Shader | G06Q 20/102 |
| 2020/0082402 | A1* | 3/2020 | Patel | G06Q 20/401 |
| 2020/0118089 | A1* | 4/2020 | Bartrim | G06Q 20/02 |
| 2020/0118090 | A1* | 4/2020 | Bartrim | G06Q 20/4014 |
| 2020/0118091 | A1* | 4/2020 | Bartrim | G06Q 20/3224 |
| 2020/0118106 | A1* | 4/2020 | Bartrim | G06Q 20/38215 |
| 2020/0160338 | A1* | 5/2020 | Patel | G07F 9/009 |

FOREIGN PATENT DOCUMENTS

| | | |
|---|---|---|
| CN | 104063790 | 9/2014 |
| CN | 104252675 | 12/2014 |
| CN | 104657847 | 5/2015 |
| WO | 2015148850 | 10/2015 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

International Search Report issued by the International Searching Authority in International Application No. PCT/CN2016/112264 dated Mar. 23. 2017; 8 pages.

* cited by examiner

DATA INTERACTION METHOD AND DEVICE, AND OFFLINE CREDIT PAYMENT METHOD AND DEVICE

This application is a continuation of PCT Application No. PCT/CN2016/112264, filed on Dec. 27, 2016, which claims priority to Chinese Patent Application No. 201610006675.6, filed on Jan. 5, 2016, and each application is hereby incorporated by reference in its entirety.

TECHNICAL FIELD

The present application relates to the field of data interaction technologies, and in particular, to a data interaction method and device, and an offline credit payment method and device.

BACKGROUND

Conventionally, magnetic stripe credit cards are usually used for payment. However, users usually encounter problems such as skimming fraud and identity theft. At present, although some new credit cards employ smart card carriers to improve security, many transactions are still conducted by using magnetic stripe credit cards. In addition, payment limits of credit cards are usually high, and the users need to visit credit card issuers to adjust the limits. If magnetic stripe information is duplicated or credit cards are lost, the users may suffer heavy losses. Therefore, security coefficients of these magnetic stripe credit cards are relatively low. Moreover, network-based payment is usually performed through bank card (including credit card) transfer, and the user's funds need to be processed in real time during the payment.

SUMMARY

An implementation of the present application provides a data interaction method, including: collecting authorization data for current interaction obtained by an intelligent terminal from a remote server; and recording the authorization data and data of the current interaction.

An implementation of the present application further provides a data interaction method, including: obtaining authorization data for current interaction of a user from a remote server; and providing the authorization data for an interaction terminal, so that the interaction terminal can perform processing based on the authorization data.

An implementation of the present application further provides a data interaction method, including: obtaining an authorization request sent by a user through an intelligent terminal; and sending authorization data for current interaction of the user to the intelligent terminal based on the authorization request from the intelligent terminal.

An implementation of the present application further provides an interaction terminal, including: a collection unit, configured to collect authorization data for current interaction obtained by an intelligent terminal from a remote server; and a recording unit, configured to record the authorization data and data of the current interaction.

An implementation of the present application further provides an intelligent terminal, including: an acquisition unit, configured to obtain authorization data for current interaction of a user from a remote server; and a communication unit, configured to provide the authorization data for an interaction terminal, so that the interaction terminal can perform processing based on the authorization data.

An implementation of the present application further provides a remote server, including: an acquisition unit, configured to obtain an authorization request sent by a user through an intelligent terminal; and a processing unit, configured to send authorization data for current interaction of the user to the intelligent terminal based on the authorization request from the intelligent terminal.

An implementation of the present application further provides an offline credit payment method, including: collecting credit authorization data for a current transaction obtained by an intelligent terminal from a remote server; and recording the credit authorization data and data of the current transaction.

An implementation of the present application further provides an offline credit payment method, including: obtaining credit authorization data for a current transaction of a user from a remote server; and providing the credit authorization data for a fee deduction terminal, so that the fee deduction terminal performs processing based on the credit authorization data.

An implementation of the present application further provides an offline payment method, including: obtaining a credit authorization request sent by a user through an intelligent terminal; and sending credit authorization data for a current transaction of the user to the intelligent terminal based on the credit authorization request from the intelligent terminal.

An implementation of the present application further provides a fee deduction terminal, including: a collection unit, configured to collect credit authorization data for a current transaction obtained by an intelligent terminal from a remote server; and a recording unit, configured to record the credit authorization data and data of the current transaction.

An implementation of the present application further provides an intelligent terminal, including: an acquisition unit, configured to obtain credit authorization data for a current transaction of a user from a remote server; and a communication unit, configured to provide the credit authorization data for a fee deduction terminal, so that the fee deduction terminal performs processing based on the credit authorization data.

An implementation of the present application further provides a remote server, including: an acquisition unit, configured to obtain a credit authorization request sent by a user through an intelligent terminal; and a processing unit, configured to send credit authorization data for a current transaction of the user to the intelligent terminal based on the credit authorization request from the intelligent terminal.

An implementation of the present application further provides an offline credit payment system, including an intelligent terminal, a remote server, and a fee deduction terminal, where the remote server is configured to send credit authorization data for a current transaction of a user to the intelligent terminal based on a credit authorization request from the intelligent terminal; the intelligent terminal is configured to obtain the credit authorization data from the remote server; and the fee deduction terminal is configured to: collect the credit authorization data from the intelligent terminal, and record the credit authorization data and data of the current transaction.

It can be seen from the technical solutions provided in the implementations of the present application that, a transaction can be processed based on authorization of the remote server to improve payment efficiency.

Certainly, products or methods that implement the present application do not necessarily need to achieve the earlier mentioned advantages.

BRIEF DESCRIPTION OF DRAWINGS

To describe the technical solutions in the implementations of the present application or in the existing technology more clearly, the following briefly describes the accompanying drawings for illustrating the implementations or the existing technology. Apparently, the accompanying drawings in the following description merely show some implementations of the present application, and a person of ordinary skill in the art can still derive other drawings from these accompanying drawings without creative efforts.

DESCRIPTION OF IMPLEMENTATIONS

Figure 1:
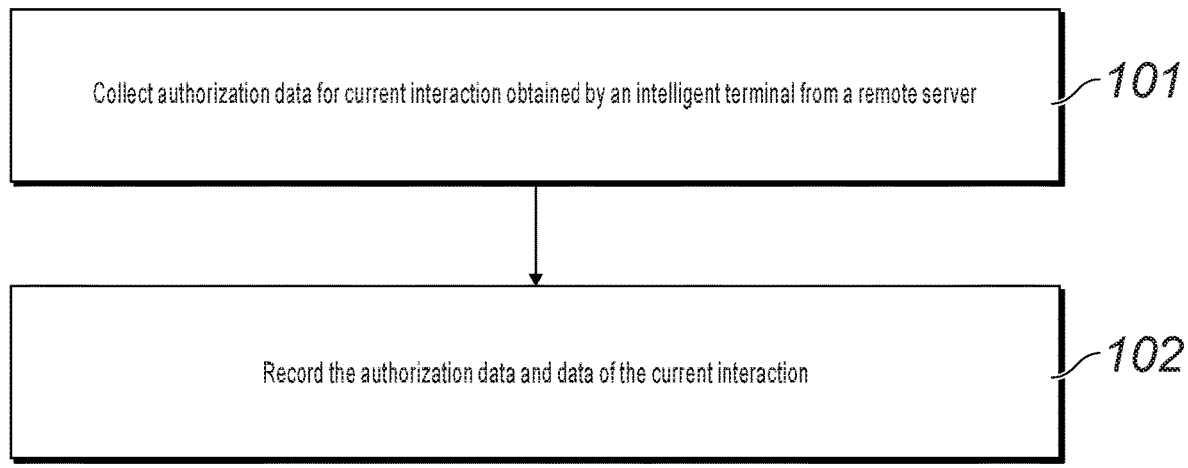
FIG. 1 is a flowchart illustrating a data interaction method, according to an implementation of the present application.

Implementations of the present application provide a data interaction method and device, and an offline credit payment method and device.

To make a person skilled in the art better understand the technical solutions in the present application, the following clearly and completely describes the technical solutions in the implementations of the present application with reference to the accompanying drawings in the implementations of the present application. Apparently, the described implementations are merely some, but not all of the implementations of the present application. Other implementations obtained by a person of ordinary skill in the art based on the implementations of the present application without creative efforts shall fall within the protection scope of the present application.

The technical solutions provided in the present application can be used for credit payment scenarios where the payment amount is small and the payment is made frequently, such as, making payment for taking a bus, taking a subway, etc. In the technical solutions provided in the present application, during a transaction, a payment deduction can be made through the interaction between a transaction user end, such as an intelligent terminal held by a user interaction, and a transaction processing end, such as a fee deduction terminal on a bus. Further, both the transaction user end and the transaction processing end can complete the payment transaction through the interaction with a remote server. Certainly, the technical solutions provided in the present application are not limited to a payment application. For example, the technical solutions can be used to process bonus points earned by subscribers (bonus points are rewarded by merchants to the subscribers, and the subscribers can get discounts when using the bonus points to purchase certain products or services).

For conventional credit payment, that is, credit card based payment, an online operation needs to be performed on a point-of-sale (POS) machine. In some situations, for example, when purchasing a subway ticket, the transaction time can be relatively long. The interaction method disclosed in the present application can implement offline payment, that is, the transaction processing end can process payments without accessing the real-time network, increasing an interaction speed. In addition, the mutual interaction can be implemented even when the network connection is poor, so a fee deduction can be made offline. Moreover, credit authorization data generated during each transaction can be temporary to reduce the chance that such data is reused. As such, problems existing in the current technology, such as financial losses caused by a leak of information associated with magnetic stripe bank cards can be alleviated. Certainly, the credit authorization data can be used for a longer time in some cases, for example, one year, one month, or one week. In other words, the authorization data can be obtained every year, every month, or every week, instead of being generated temporarily during each transaction. When authorization fails, the user is notified to obtain new authorization data. The following describes the technical solutions of the present application in detail.

FIG. 1 is a flowchart illustrating a data interaction method, according to an implementation of the present application. The method can be applied to a transaction between a transaction user end and a transaction processing end. The transaction user end can be an intelligent terminal held by a user, such as a mobile phone, and the transaction processing terminal can be a merchant terminal. This implementation is described by using processing between the intelligent terminal held by the user and the merchant terminal. The method can include the following steps:

Step 101: Collect authorization data for current interaction obtained by an intelligent terminal from a remote server.

Step 102: Record the authorization data and data of the current interaction.

Step 101 and step 102 are performed by the merchant terminal. The merchant terminal can collect the authorization data sent by the intelligent terminal, and record the authorization data and the data of the current interaction.

In an implementation of the present application, the merchant terminal records the authorization data and the data of the current interaction, and then checks the authorization data and the data of the current interaction with the remote server at a predetermined time. In other words, the merchant terminal can interact with the remote server in the back end to check the authorization data and the data of the interaction in the current transaction, and synchronize the data with the remote server for recording and other processing.

In an implementation of the present application, the collecting authorization data for current interaction obtained by an intelligent terminal from a remote server further includes: scanning a barcode generated by the intelligent terminal based on the authorization data to obtain the authorization data; or obtaining the authorization data from the intelligent terminal through wireless communication.

In an implementation of the present application, the barcode includes a one-dimensional barcode and/or a two-dimensional barcode, and the wireless communication includes NFC or RFID.

In an implementation of the present application, after the authorization data for current interaction is obtained by an intelligent terminal from a remote server, to verify the authorization data, the method further includes performing one or more of the following operations: comparing time information included in the authorization data with a current time, and if the current time is later than the time information included in the authorization data, determining that the authorization data has expired, and canceling the current data interaction; determining whether a random number included in the authorization data exists in previous data interaction, and if yes, determining that the authorization data is repeatedly used, and canceling the current data interaction; and determining whether the data of the current interaction exceeds a threshold of the authorization data, and if yes, canceling the current data interaction.

In an implementation of the present application, the collected authorization data for the current interaction obtained by the intelligent terminal from the remote server further includes signature information used by the remote server to sign the authorization data by using a private key; and after the collecting authorization data for current interaction obtained by an intelligent terminal from a remote server, but before the recording the authorization data and data of the current interaction, the method further includes: verifying the signature information by using a public key pre-obtained from the remote server, and determining whether the authorization data is sent by the remote server, where if yes, the authorization data and the data of the current interaction are recorded.

The authorization data for the current interaction can be obtained by the intelligent terminal from the remote server in real time. Alternatively, after being obtained by the intelligent terminal from the remote server, the authorization data can be valid within a period of time, for example, one month.

In the preceding interaction process, the merchant terminal can interact with the intelligent terminal without accessing the network, and therefore a time for the merchant terminal to access the network is saved. In addition, interaction with the intelligent terminal can be successfully completed when the network is in a poor condition.

Figure 2:
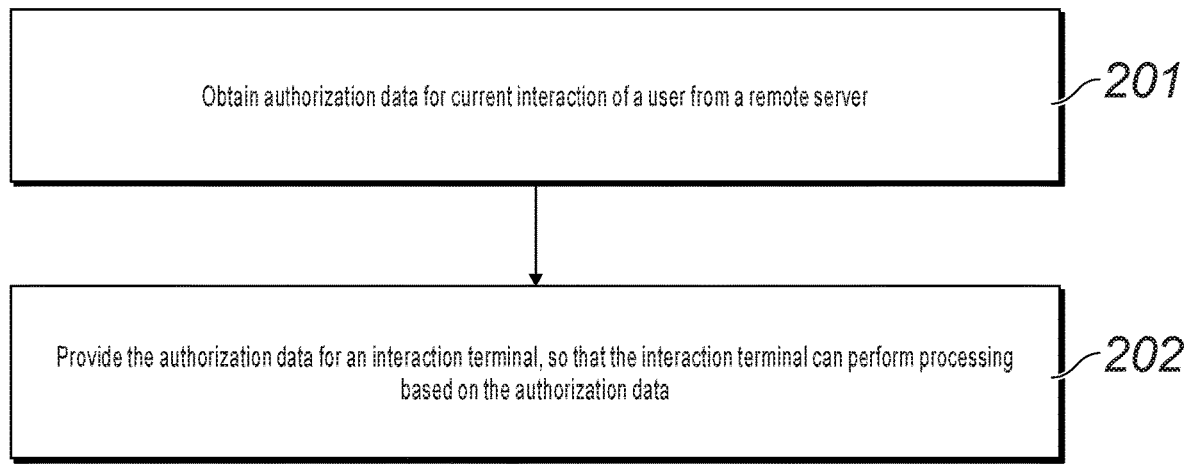
FIG. 2 is a flowchart illustrating a data interaction method, according to an implementation of the present application.

FIG. 2 is a flowchart illustrating a data interaction method, according to an implementation of the present application. A data interaction process of an intelligent terminal in the present application is illustrated in FIG. 2. The method includes the following steps:

Step 201: Obtain authorization data for current interaction of a user from a remote server.

Step 202: Provide the authorization data for an interaction terminal, so that the interaction terminal can perform processing based on the authorization data.

Sending authorization data to an interaction terminal includes presenting the authorization data to a fee deduction terminal in the form of a barcode, and further includes sending interaction data such as authorization data to the fee deduction terminal through RFID.

In an implementation of the present application, the obtaining authorization data for current interaction of a user from a remote server further includes: sending a unique identifier of the user to the remote server; and receiving authorization data that includes user information and that is generated by the remote server based on the unique identifier.

In an implementation of the present application, the authorization data further includes time information of the current authorization, a random number of the current authorization, and a threshold.

Step 201 and step 202 can implement interaction between a transaction user end and a transaction processing end in combination with step 101 and step 102. Step 201 and step 202 can be performed by the transaction user end based on a transaction request triggered by the transaction processing end.

Figure 3:
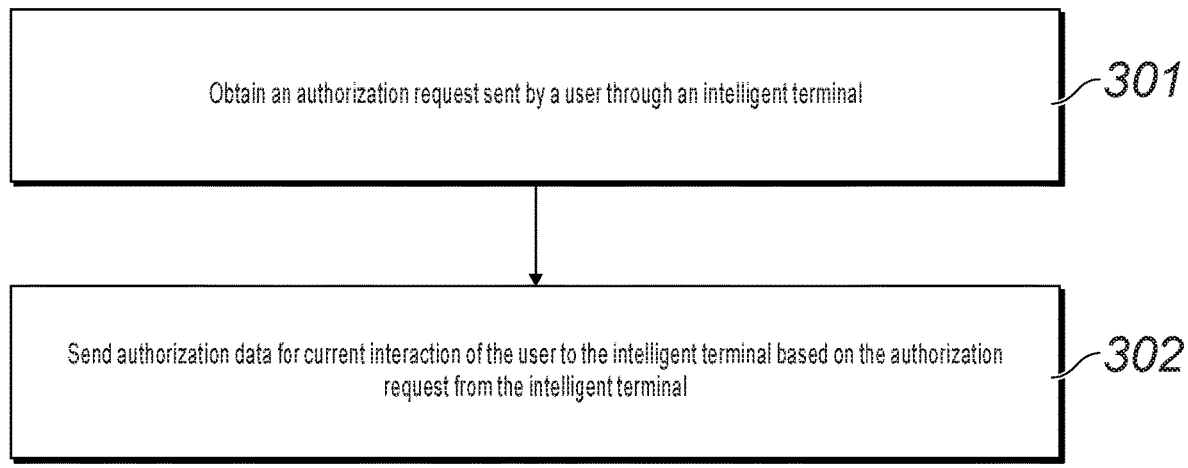
FIG. 3 is a flowchart illustrating a data interaction method, according to an implementation of the present application.

FIG. 3 is a flowchart illustrating a data interaction method, according to an implementation of the present application. A work process of a remote server in data interaction is illustrated in FIG. 3. The remote server generates authorization data based on a user's request and sends the authorization data to an intelligent terminal. The method includes the following steps:

Step 301: Obtain an authorization request sent by a user through an intelligent terminal.

Step 302: Send authorization data for current interaction of the user to the intelligent terminal based on the authorization request from the intelligent terminal.

In an implementation of the present application, the authorization request includes a unique identifier of the user, and the sending authorization data for current interaction of the user to the intelligent terminal includes: generating authorization data including user information based on the unique identifier, and sending the authorization data for the current interaction of the user to the intelligent terminal. The unique identifier of the user can be a user name, a device identifier of the intelligent terminal held by the user, or a combination of both. As such, security of authorization data acquisition by the user can be ensured.

In an implementation of the present application, the sending authorization data for current interaction of the user to the intelligent terminal includes: encrypting the user information, signing the authorization data by using a private key, and delivering signature information and the authorization data to the intelligent terminal by using a password.

The user information can be encrypted by using an existing encryption method, for example, by using a pair of private key and public key. Details are not described here.

In this implementation of the present application, after the remote server sends the authorization data to the intelligent terminal, the intelligent terminal can interact with the transaction processing end offline based on the authorization data.

Figure 4:
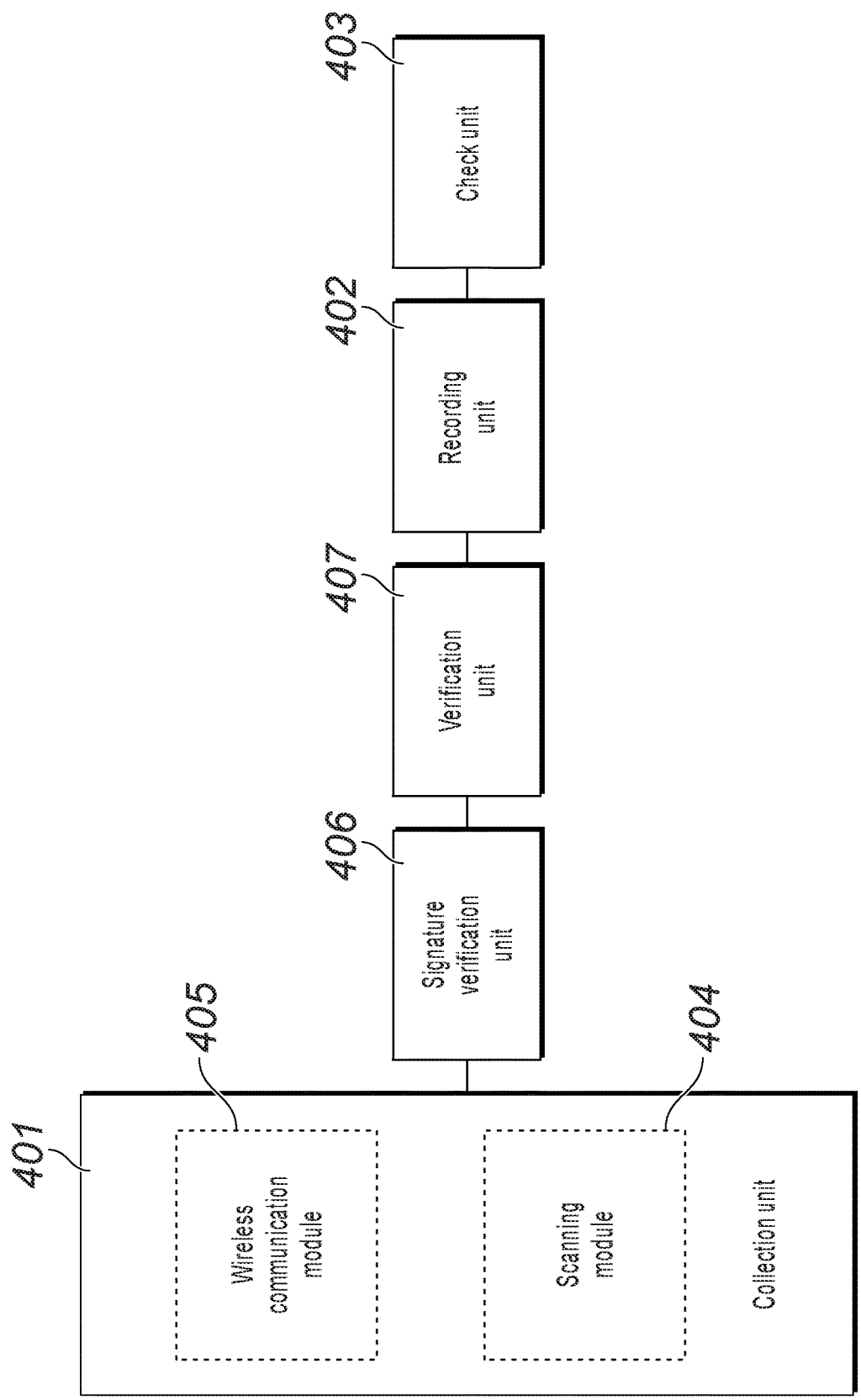
FIG. 4 is a schematic diagram illustrating an interaction terminal, according to an implementation of the present application.

FIG. 4 is a schematic diagram illustrating an interaction terminal, according to an implementation of the present application. Functional units in FIG. 4 can be implemented by using a logic circuit, a chip, or a high-performance computer.

The interaction terminal includes: a collection unit 401, configured to collect authorization data for current interaction obtained by an intelligent terminal from a remote server; and a recording unit 402, configured to record the authorization data and data of the current interaction.

In an implementation of the present application, the interaction terminal further includes a check unit 403, configured to check the authorization data and the data of the current interaction with the remote server at a predetermined time.

In an implementation of the present application, the collection unit further includes a scanning module 404, configured to scan a barcode generated by the intelligent terminal based on the authorization data to obtain the authorization data; or the collection unit further includes a wireless communication module 405, configured to obtain the authorization data from the intelligent terminal through wireless communication.

The barcode includes a one-dimensional barcode and/or a two-dimensional barcode, and the wireless communication includes NFC or RFID.

In an implementation of the present application, the interaction terminal further includes a verification unit 407, configured to perform one or more of the following operations to verify the authorization data: comparing time information included in the authorization data with a current time, and if the current time is later than the time information included in the authorization data, determining that the authorization data has expired, and canceling the current data interaction; determining whether a random number included in the authorization data exists in previous data interaction, and if yes, determining that the authorization data is repeatedly used, and canceling the current data interaction; and determining whether the data of the current interaction exceeds a threshold of the authorization data, and if yes, canceling the current data interaction.

In an implementation of the present application, the collected authorization data for the current interaction obtained by the intelligent terminal from the remote server further includes signature information used by the remote server to sign the authorization data by using a private key, and the interaction terminal further includes: a signature verification unit 406, configured to: verify the signature information by using a public key pre-obtained from the remote server, and determine whether the authorization data is sent by the remote server, where if yes, the recording unit records the authorization data and the data of the current interaction.

The interaction terminal in this implementation can be the previously described transaction processing end, for example, the merchant terminal, and can perform the steps in this method. Details are not described here.

Figure 5:
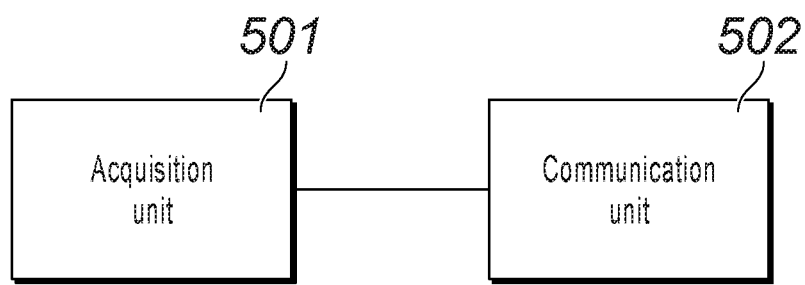
FIG. 5 is a schematic diagram illustrating an intelligent terminal, according to an implementation of the present application.

FIG. 5 is a schematic diagram illustrating an intelligent terminal, according to an implementation of the present application. A structure of the intelligent terminal for implementing the data interaction in the present application is illustrated in FIG. 5. Certainly, the intelligent terminal can further include other essential parts such as a touchscreen, a battery, a memory, or a circuit board, and details are not described here. The intelligent terminal can be a smartphone, a tablet computer, an intelligent wearable device, etc.

The intelligent terminal includes: an acquisition unit 501, configured to obtain authorization data for current interaction of a user from a remote server; and a communication unit 502, configured to provide the authorization data for an interaction terminal, so that the interaction terminal can perform processing based on the authorization data.

In an implementation of the present application, the acquisition unit 501 is further configured to: send a unique identifier of the user to the remote server, and receive authorization data that includes user information and that is generated by the remote server based on the unique identifier.

In an implementation of the present application, the authorization data further includes time information of current authorization, a random number of the current authorization, and a threshold.

Figure 6:
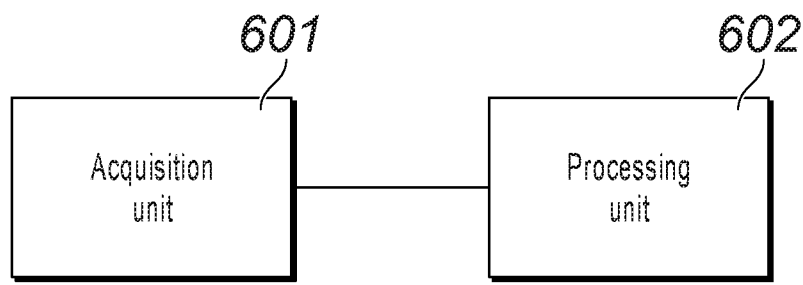
FIG. 6 is a schematic diagram illustrating a remote server, according to an implementation of the present application.

FIG. 6 is a schematic diagram illustrating a remote server, according to an implementation of the present application. A structure of the remote server for data interaction in the present application is illustrated in FIG. 6. Certainly, the remote server can further include other essential parts such as an input/output device, a communication unit, a power supply, a memory, or a circuit board, and details are not described here. The remote server can be a high-performance computer or a computer cluster.

The remote server includes: an acquisition unit 601, configured to obtain an authorization request sent by a user through an intelligent terminal; and a processing unit 602, configured to send authorization data for current interaction of the user to the intelligent terminal based on the authorization request from the intelligent terminal.

In an implementation of the present application, the authorization request includes a unique identifier of the user, and the processing unit is configured to: generate authorization data including user information based on the unique identifier, and send the authorization data for the current interaction of the user to the intelligent terminal.

In an implementation of the present application, that the processing unit sends authorization data for current interaction of the user to the intelligent terminal includes: encrypting the user information, signing the authorization data by using a private key, and delivering signature information and the authorization data to the intelligent terminal by using a password.

The following describes a technical implementation process of payment in detail.

Figure 7:
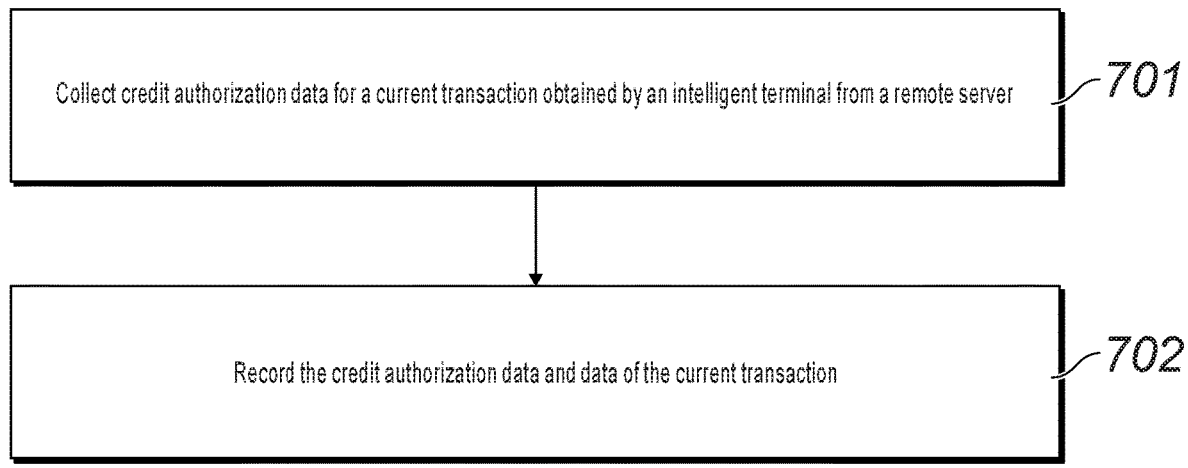
FIG. 7 is a flowchart illustrating an offline credit payment method, according to an implementation of the present application.

FIG. 7 is a flowchart illustrating an offline credit payment method, according to an implementation of the present application. FIG. 7 describes a fee deduction for a user implemented by a fee deduction terminal without accessing a network, so that credit authorization data and transaction data are sent to an institute such as a bank to complete an offline fee deduction. The fee deduction terminal can be a POS machine or another fee deduction device, and needs to register with a server in advance and obtain corresponding authorization before performing a credit deduction. The fee deduction terminal records a fee deduction of the current payment transaction to complete the current payment transaction, and periodically sends fee deduction records to the server for checking, user's consumption. The method includes the following steps:

Step 701: Collect credit authorization data for a current transaction obtained by an intelligent terminal from a remote server.

Step 702: Record the credit authorization data and data of the current transaction.

In an implementation of the present application, after the credit authorization data and the data of the current transaction are recorded, the method further includes: checking the credit authorization data and the data of the current transaction with the remote server at a predetermined time.

Before the credit authorization data and the data of the current transaction are checked, the fee deduction terminal may not immediately communicate with the remote server after recording the credit authorization data and the data of the current transaction. The fee deduction terminal needs to communicate with the remote server to complete the checking. After the fee deduction terminal performs the checking twice, the fee deduction terminal can send credit authorization data generated in the time interval between these two checks and corresponding transaction data to the remote server, saving the time needed by the fee deduction terminal to perform credit authorization communication with the remote server during each transaction. A large amount of checked data can be sent to the remote server all at once at the predetermined time. The remote server deducts a payment from an account of the user based on the credit authorization data and the transaction data.

In an implementation of the present application, the credit authorization data for the current transaction includes at least time information of the current credit authorization, a random number of the current credit authorization, user account information, and a credit limit.

The credit authorization data is obtained from the remote server, and the time information of the current credit authorization further includes a current time and valid duration of the current credit authorization. Therefore, it can be determined when the current credit authorization starts and expires. If the current time is later than a time limit of the current credit authorization, a subsequent fee deduction is not allowed. The random number of the current credit authorization is a unique identifier of the current credit authorization, that is, each time the credit authorization is independent, and a new identifier is generated during each credit authorization, therefore each credit authorization can be distinguished. The user account information can further include an account ID of the user, a bank card number (credit card number) of the user, etc. The credit limit can be used to indicate an upper limit of a deducted amount of the current transaction, and if the deducted amount exceeds the upper limit, the transaction fails.

In an implementation of the present application, the collecting credit authorization data for a current transaction obtained by an intelligent terminal from a remote server further includes: scanning a barcode generated by the intelligent terminal based on the credit authorization data, to obtain the credit authorization data; or obtaining the credit authorization data from the intelligent terminal through wireless communication.

The barcode includes a two-dimensional barcode or a one-dimensional barcode, and the wireless communication includes NFC, RFID, Bluetooth, etc.

In an implementation of the present application, after the collecting credit authorization data for a current transaction obtained by an intelligent terminal from a remote server, the method further includes: performing one or more of the following operations to verify the credit authorization data: comparing time information included in the credit authorization data with a current time, and if the current time is later than the time information included in the credit authorization data, determining that the credit authorization data has expired, and canceling the current transaction; determining whether a random number included in the credit authorization data exists in previous transaction data; and if yes, determining that the credit authorization data is repeatedly used, and canceling the current transaction; and determining whether an amount of the current transaction exceeds a credit limit included in the credit authorization data, and if yes, canceling the current transaction.

In the previously described step, the credit authorization data can exclude time information, and the credit authorization data is obtained by the intelligent terminal all at once and can be used for a period of time, such as one week or one month. Only the credit limit needs to be verified during a fee deduction, and the credit authorization data stored in the intelligent terminal will be modified (progressively decreased) after a fee deduction (data interaction is usually performed through wireless communication, and the intelligent terminal is notified of a deducted amount). If the credit limit is reduced to 0 or lower than a threshold, the credit authorization data cannot be used for transactions.

In an implementation of the present application, the collected credit authorization data for the current transaction obtained by the intelligent terminal from the remote server further includes signature information used by the remote server to sign the credit authorization data by using a private key; and after the collecting credit authorization data for a current transaction obtained by an intelligent terminal from a remote server, but before the recording the credit authorization data and data of the current transaction, the method further includes: verifying the signature information by using a public key pre-obtained from the remote server, and determining whether the credit authorization data is sent by the remote server, where if yes, the credit authorization data and the data of the current transaction are recorded.

In this implementation, the authorization data obtained by the intelligent terminal from the remote server can be temporary or one-time (for example, one-time authorization that is valid for a certain period of time).

In the method in this implementation of the present application, the fee deduction terminal can quickly complete a payment transaction without accessing a network even when a user is not using bank cards. Credit authorization data is temporarily generated during each transaction and therefore cannot be reused. As such, problems existing in the current technology, such as financial losses caused by a leak of information associated with magnetic stripe bank cards can be alleviated.

Figure 8:
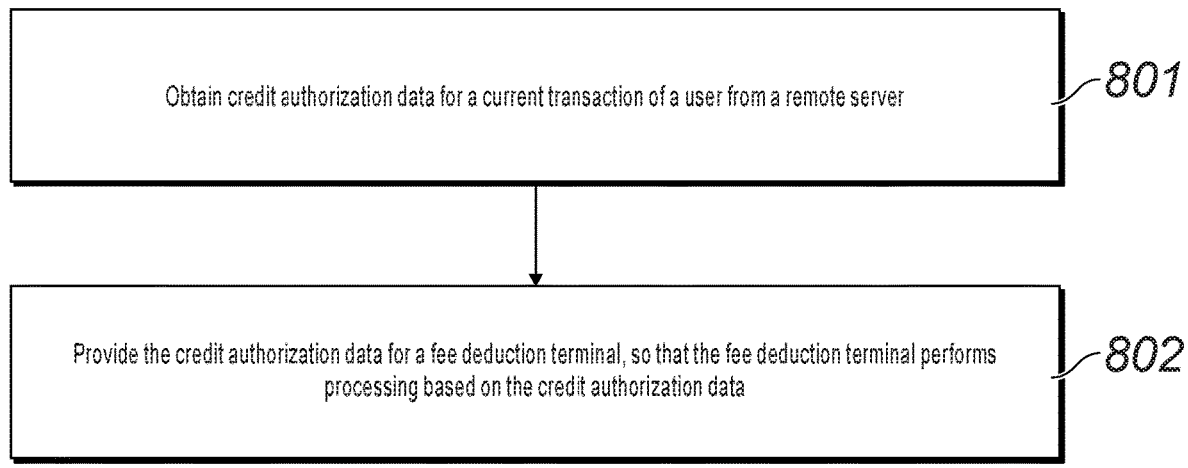
FIG. 8 is a flowchart illustrating an offline credit payment method, according to an implementation of the present application.

FIG. 8 is a flowchart illustrating an offline credit payment method, according to an implementation of the present application. An offline payment process between an intelligent terminal and a fee deduction terminal after the intelligent terminal obtains credit authorization data is illustrated in FIG. 8. The method includes the following steps:

Step 801: Obtain credit authorization data for a current transaction of a user from a remote server.

Step 802: Provide the credit authorization data for a fee deduction terminal, so that the fee deduction terminal performs processing based on the credit authorization data.

In an implementation of the present application, the obtaining credit authorization data for a current transaction of a user from a remoter server further includes: sending a unique identifier of the user to the remote server; and receiving credit authorization data that includes user account information and that is generated by the remote server based on the unique identifier.

The identifier can be a user name such as a user ID, a device identifier of the intelligent terminal, or a combination of both.

In the present step, the intelligent terminal can communicate with the remote server through a network to obtain the credit authorization data that includes user account information, so that a delay of connection to the network during a transaction between the fee deduction terminal and each intelligent terminal can be reduced. The user account information included in the credit authorization data can be a bank card number, a telephone number, etc.

In an implementation of the present application, the credit authorization data can further include time information of current credit authorization, a random number of the current credit authorization, and a credit limit.

Figure 9:
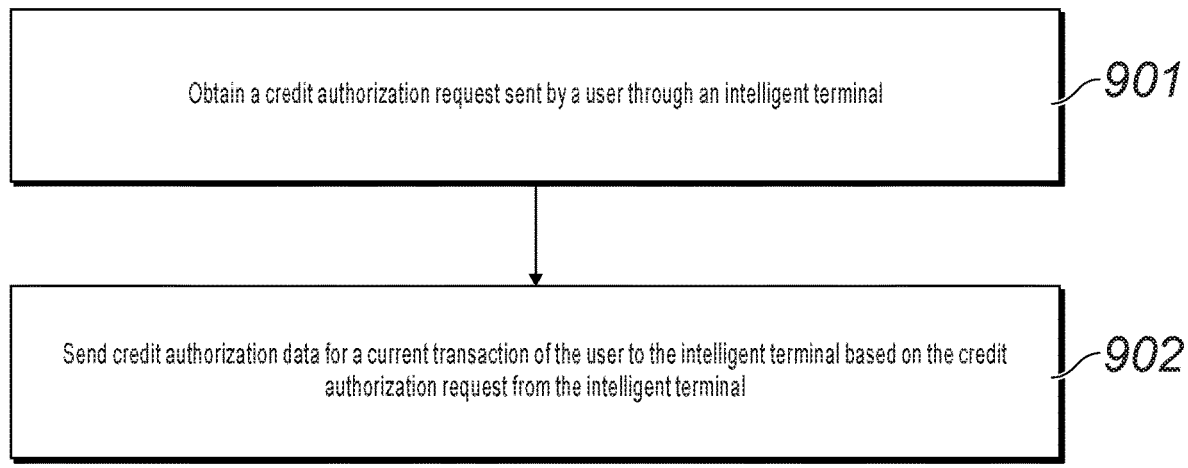
FIG. 9 is a flowchart illustrating an offline credit payment method, according to an implementation of the present application.

FIG. 9 is a flowchart illustrating an offline credit payment method, according to an implementation of the present application. A work process of a remote server in the offline payment method is illustrated in FIG. 9. The method includes the following steps:

Step 901: Obtain a credit authorization request sent by a user through an intelligent terminal.

Step 902: Send credit authorization data for a current transaction of the user to the intelligent terminal based on the credit authorization request from the intelligent terminal.

In an implementation of the present application, the credit authorization request includes a unique identifier of the user, and the sending credit authorization data for a current transaction of the user to the intelligent terminal includes: generating credit authorization data including user information based on the unique identifier, and sending the credit authorization data for the current transaction of the user to the intelligent terminal.

In an implementation of the present application, the sending credit authorization data for a current transaction of the user to the intelligent terminal includes: encrypting the user information, signing the credit authorization data by using a private key, and delivering signature information and the credit authorization data to the intelligent terminal by using a password.

After the credit authorization data is signed by using the private key in the present step, the fee deduction terminal needs to verify a signature of the credit authorization data by using a public key, that is, the fee deduction terminal needs to verify whether the credit authorization data is sent by the remote server. User account information needs to be encrypted because it is insecure to store the user account information in the fee deduction terminal. For an encryption method, refer to the method in the existing technology, and details are not described here.

The steps in FIG. 7, FIG. 8, and FIG. 9 can be combined to implement credit payment. When making a payment, the process can be actively initiated by the intelligent terminal or the fee deduction terminal. For example, in a scenario where making payment for bus tickets, an NFC device of an intelligent terminal and an NFC device of a fee deduction terminal on a bus can interact with each other, and the fee deduction terminal can initiate a payment process by using the NFC device, that is, the fee deduction terminal can initiate a payment request and then obtain authorization data from the intelligent terminal to complete payment. For another example in the same scenario, the fee deduction terminal on the bus can use a barcode scanning device to scan a two-dimensional barcode displayed on the intelligent terminal held by the user to initiate a payment process.

Figure 10:
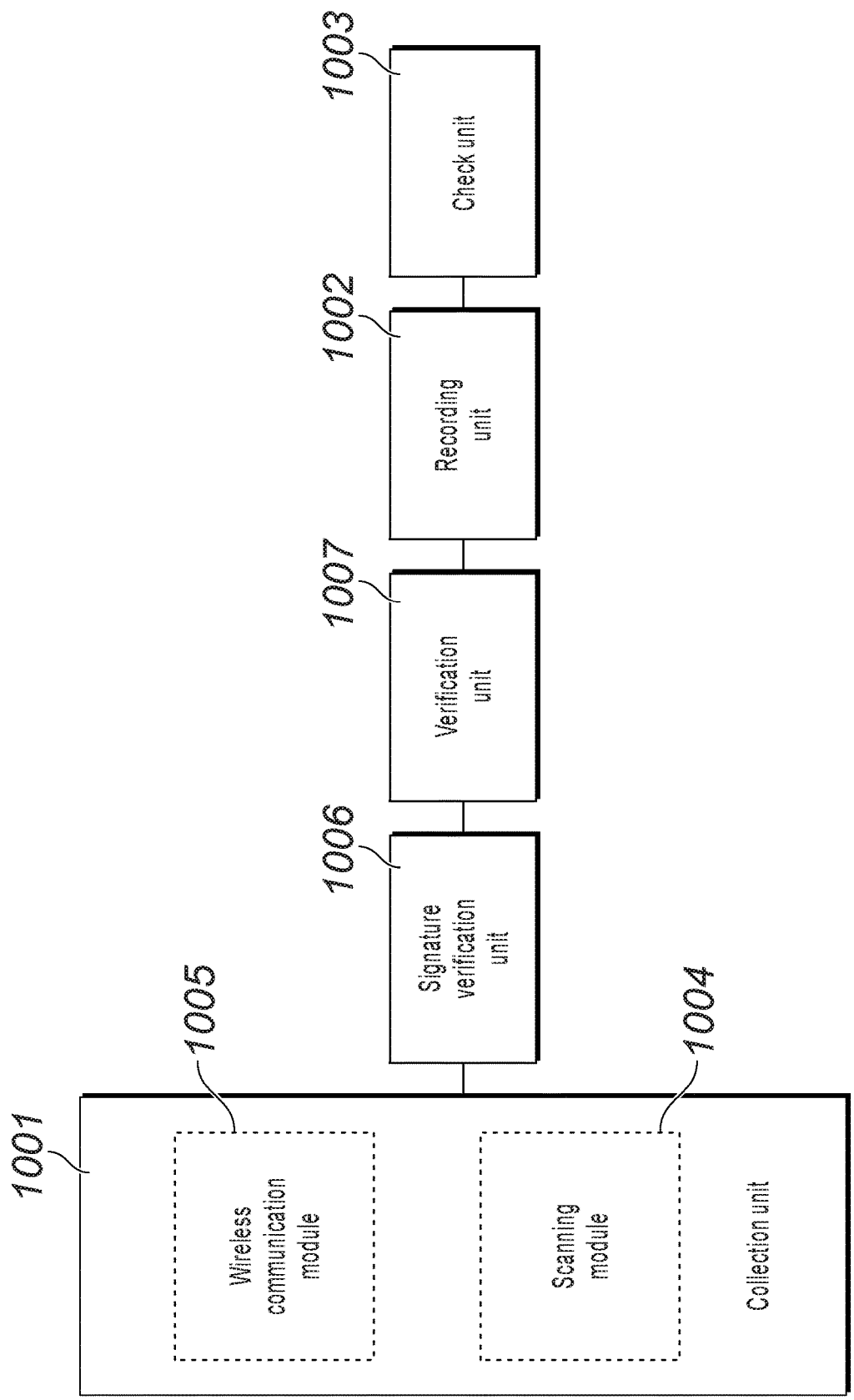
FIG. 10 is a schematic diagram illustrating a fee deduction terminal, according to an implementation of the present application.

FIG. 10 is a schematic diagram illustrating a fee deduction terminal, according to an implementation of the present application. The fee deduction terminal in FIG. 10 can include a POS machine, a smartphone, etc., and functional units of the fee deduction terminal can be implemented by using a logic circuit, a chip, or a high-performance computer.

The fee deduction terminal includes: a collection unit 1001, configured to collect credit authorization data for a current transaction obtained by an intelligent terminal from a remote server; and a recording unit 1002, configured to record the credit authorization data and data of the current transaction.

In an implementation of the present application, the fee deduction terminal further includes a check unit 1003, configured to check the credit authorization data and the data of the current transaction with the remote server at a predetermined time.

In an implementation of the present application, the credit authorization data for the current transaction includes at least time information of current credit authorization, a random number of the current credit authorization, user account information, and a credit limit.

In an implementation of the present application, the collection unit further includes a scanning module 1004, configured to scan a barcode generated by the intelligent terminal based on the credit authorization data, to obtain the credit authorization data; or the collection unit further includes a wireless communication module 1005, configured to obtain the credit authorization data from the intelligent terminal through wireless communication.

In an implementation of the present application, the barcode includes a one-dimensional barcode and/or a two-dimensional barcode, and the wireless communication includes NFC or RFID.

In an implementation of the present application, the fee deduction terminal further includes a verification unit 1007, configured to perform one or more of the following operations to verify the credit authorization data: comparing time information included in the credit authorization data with a current time, and if the current time is later than the time information included in the credit authorization data, determining that the credit authorization data has expired, and canceling the current transaction; determining whether a random number included in the credit authorization data exists in previous transaction data; and if yes, determining that the credit authorization data is repeatedly used, and canceling the current transaction; and determining whether an amount of the current transaction exceeds a credit limit included in the credit authorization data, and if yes, canceling the current transaction.

In an implementation of the present application, the collected credit authorization data for the current transaction obtained by the intelligent terminal from the remote server further includes signature information used by the remote server to sign the credit authorization data by using a private key, and the fee deduction terminal further includes: a signature verification unit 1006, configured to: verify the signature information by using a public key pre-obtained from the remote server, and determine whether the credit authorization data is sent by the remote server, where if yes, the recording unit records the credit authorization data and the data of the current transaction.

Figure 11:
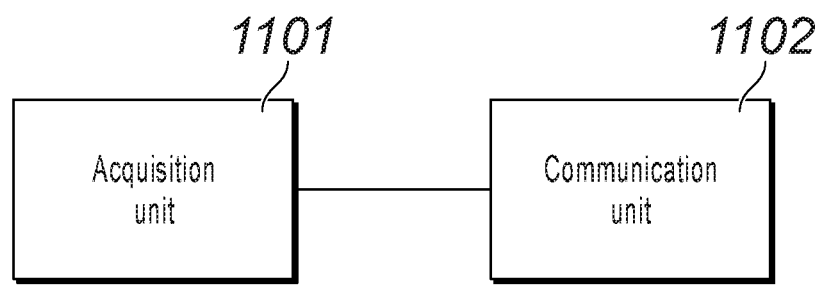
FIG. 11 is a schematic diagram illustrating an intelligent terminal, according to an implementation of the present application.

FIG. 11 is a schematic diagram illustrating an intelligent terminal, according to an implementation of the present application. A structure of the intelligent terminal for achieving the offline payment purpose of the present application is illustrated in FIG. 11. Certainly, the intelligent terminal can further include other essential parts such as a touchscreen, a battery, a memory, or a circuit board, and details are not described here. The intelligent terminal can be a smartphone, a tablet computer, an intelligent wearable device, etc.

The intelligent terminal includes: an acquisition unit 1101, configured to obtain credit authorization data for a current transaction of a user from a remote server; and a communication unit 1102, configured to provide the credit authorization data for a fee deduction terminal, so that the fee deduction terminal performs processing based on the credit authorization data.

In an implementation of the present application, the acquisition unit is further configured to: send a unique identifier of the user to the remote server, and receive credit authorization data that includes user account information and that is generated by the remote server based on the unique identifier.

In an implementation of the present application, the credit authorization data further includes time information of current credit authorization, a random number of the current credit authorization, and a credit limit.

Figure 12:
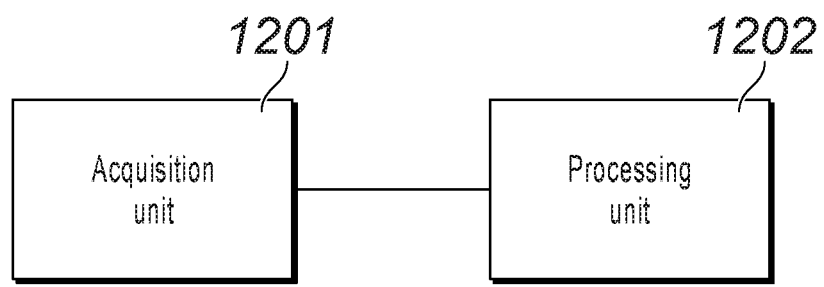
FIG. 12 is a schematic diagram illustrating a remote server, according to the present application.

FIG. 12 is a schematic diagram illustrating a remote server, according to the present application. A structure of the remote server for achieving the offline payment purpose of the present application is illustrated in FIG. 12. Certainly, the remote server can further include other essential parts such as an input/output device, a communication unit, a power supply, a memory, or a circuit board, and details are not described here. The remote server can be a high-performance computer or a computer cluster.

The remote server includes: an acquisition unit 1201, configured to obtain a credit authorization request sent by a user through an intelligent terminal; and a processing unit 1202, configured to send credit authorization data for a current transaction of the user to the intelligent terminal based on the credit authorization request from the intelligent terminal.

In an implementation of the present application, the credit authorization request includes a unique identifier of the user, and the processing unit is configured to: generate credit authorization data including user information based on the unique identifier, and send the credit authorization data for the current transaction of the user to the intelligent terminal.

In an implementation of the present application, that the processing unit sends credit authorization data for a current transaction of the user to the intelligent terminal includes: encrypting the user information, signing the credit authorization data by using a private key, and delivering signature information and the credit authorization data to the intelligent terminal by using a password.

Figure 13:
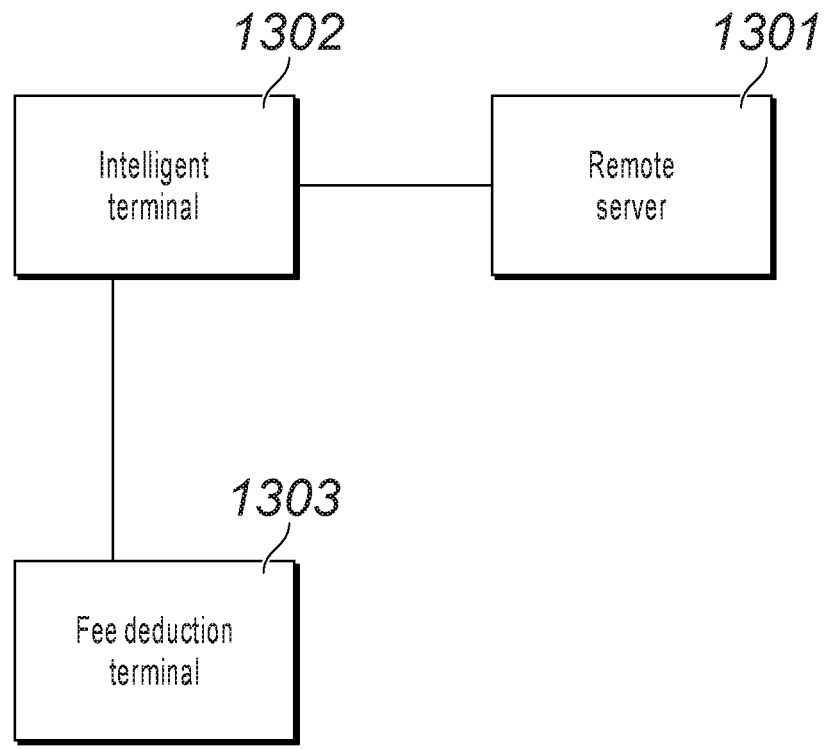
FIG. 13 is a schematic diagram illustrating an offline credit payment system, according to an implementation of the present application.

FIG. 13 is a schematic diagram illustrating an offline credit payment system, according to an implementation of the present application. A structure of the offline payment system is illustrated in FIG. 13. In this implementation, an intelligent terminal can include a smartphone, a tablet computer, etc. A fee deduction terminal can include a POS machine, a smartphone, etc. A remote server can include a high-performance computer, etc.

The offline credit payment system includes a remote server 1301, an intelligent terminal 1302, and a fee deduction terminal 1303.

The remote server 1301 is configured to send credit authorization data for a current transaction of a user to the intelligent terminal based on a credit authorization request from the intelligent terminal.

The intelligent terminal 1302 is configured to obtain the credit authorization data from the remote server.

The fee deduction terminal 1303 is configured to: collect the credit authorization data from the intelligent terminal, and record the credit authorization data and data of the current transaction.

In the system in this implementation of the present application, the fee deduction terminal can quickly complete a fee deduction transaction without accessing a network even when a user is not using bank cards. Credit authorization data is generated temporarily during each transaction and therefore cannot be reused. As such, problems existing in the current technology, such as financial losses caused by a leak of information associated with magnetic stripe bank cards can be alleviated.

Figure 14:
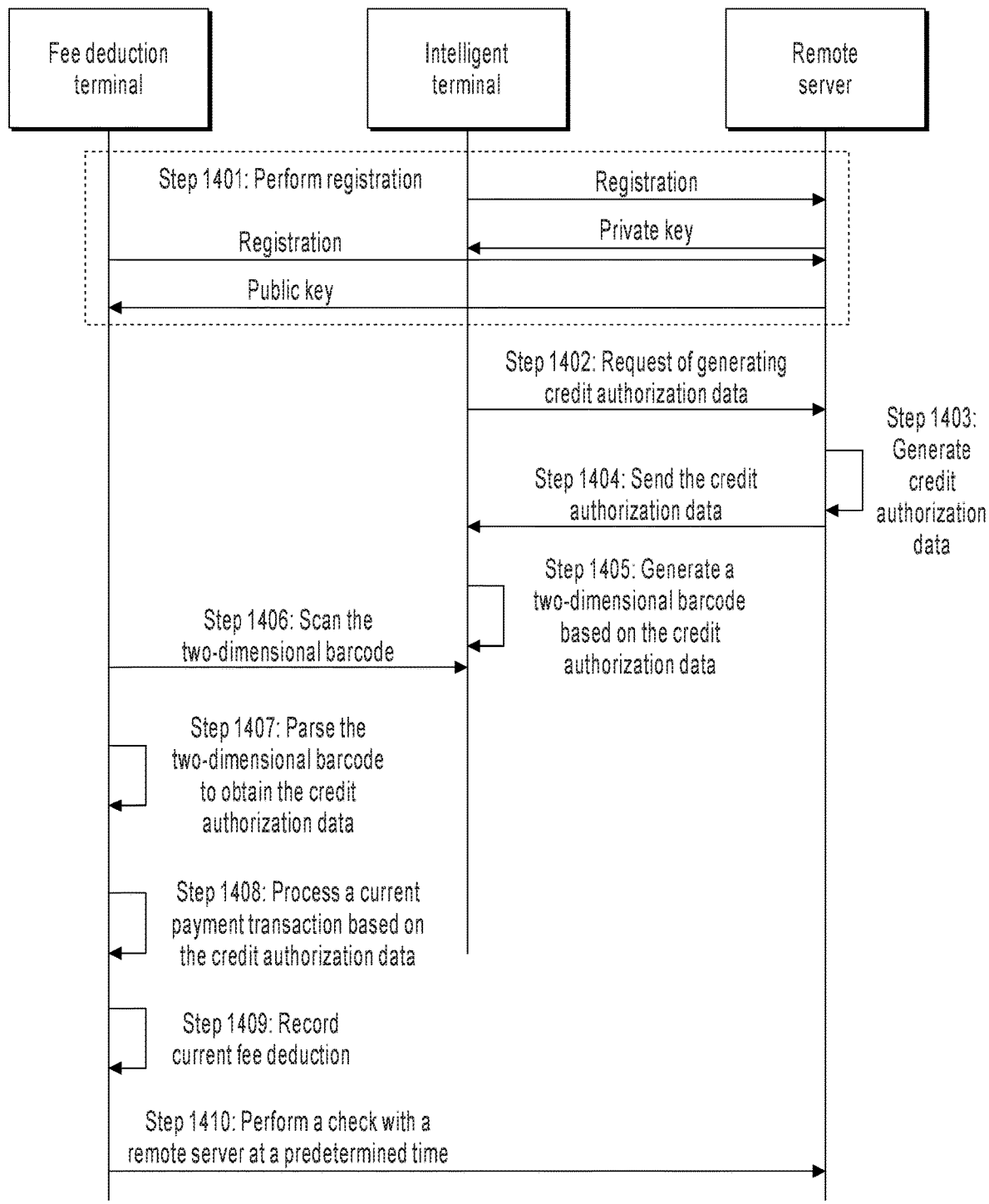
FIG. 14 is a flowchart illustrating an offline credit payment method, according to an implementation of the present application.

FIG. 14 is a flowchart illustrating an offline credit payment method, according to an implementation of the present application. In FIG. 14, a fee deduction terminal is a POS machine, an intelligent terminal is a mobile phone, and a remote server is a high-performance computer. The high-performance computer can generate credit authorization data and complete account reconciliation with the POS machine. Certainly, generation of the credit authorization data and the account reconciliation can be implemented by two or more high-performance computers. However, for simplicity, in this implementation, only one remote server is configured to complete the described two services. The method includes the following steps:

Step 1401: A credit payment client on a mobile phone registers with a remote server.

The registration process includes verifying a user identity, verifying a financial account, etc. For example, identity card information, credit card information, or bank card information of a user is verified. The remote server generates a private key based on the user identity or the financial account, and the private key is used to sign the credit authorization data later.

The credit payment client can be a software application, or be embedded in a security chip (for example, an embedded Secure Element (eSE) security chip) of the mobile phone.

The POS machine is also registered with the remote server, and the remote server delivers a public key to the POS machine. The public key is used by the POS machine to verify a signature of the credit authorization data later.

Step 1402: The credit payment client initiates a request of generating the credit authorization data to the remote server by using a radio frequency communication unit (or a WiFi network) of the mobile phone.

TOKEN (not illustrated) is used in the offline payment method described in the accompanying drawing is a token used when the mobile phone communicates with the remote server in the existing technology.

The request can further include information such as an international mobile equipment identity (IMEI) of the mobile phone or a user identity, so that the remote server can uniquely identify a user initiating the request.

Step 1403: The remote server generates the credit authorization data based on the request.

In the present step, the remote server matches corresponding financial account information of the user based on the user identity or the IMEI in the request, and obtains user information. The financial account information can include information such as a credit limit, and the user information can include a user identity, a bank card number, a private key, etc.

The remote server generates time information included in the credit authorization data, and the time information further includes a current time, that is, a start time of the credit authorization data used during a current transaction, and obtains predetermined validity duration. The remote server further generates a random number, and the random number is used to uniquely identify the credit authorization data.

The remote server generates the credit authorization data based on the time information, the random number, and the user information and the financial account information obtained in the previous step.

The remote server can further encrypt information such as the user identity or the bank card number (or the information can be encrypted on the intelligent terminal), and use the private key to sign the credit authorization data, to ensure authenticity of the data.

In the present step, the remote server can further make a determination based on a consumption payment record and the credit limit of the user. If the consumption payment record of the user is close to or exceeds the credit limit in the financial account information, the credit authorization request is rejected, and a failure reason is fed back to the credit payment client on the mobile phone.

Step 1404: The remote server integrates the credit authorization data to the TOKEN, and delivers the TOKEN to the credit payment client on the mobile phone.

Step 1405: The credit payment client generates a two-dimensional barcode based on the credit authorization data.

The two-dimensional barcode generated in the present step can be displayed on a screen of the mobile phone, or stored in a memory of the mobile phone for use during the current transaction.

Step 1406: A scanning module of a POS machine obtains the two-dimensional barcode through scanning.

A barcode scanning device in the existing technology can be used to scan the two-dimensional barcode in the present step, and data and control interfaces of the device are connected to the POS machine, so that the POS machine can control the scanning device to complete a scanning task and return scanned barcode data.

The POS machine in the present application can be a POS machine installed with a fee deduction client, or a POS machine with a data processing capability. The fee deduction client is installed on the terminal, to perform subsequent parsing, recording, etc.

Step 1407: A fee deduction client on the POS machine parses the two-dimensional barcode to obtain the credit authorization data.

In the present step, the fee deduction client can verify the signature of the credit authorization data by using the public key, thereby verifying that the credit authorization data is from the remote server.

The fee deduction client can further parse (or decrypt) the financial account information in the credit authorization data, that is, the credit limit of the current transaction.

Step 1408: The fee deduction client processes a current payment transaction based on the credit authorization data.

The processing in the present step can include: parsing the time information in the credit authorization data, and determining whether a time of the current payment transaction is later than the current time plus the validity duration in the credit authorization data. If yes, the credit authorization data has expired and therefore cannot be used for the current payment transaction, and the credit payment client can be instructed to generate new credit authorization data for the current payment transaction.

Whether the random number in the credit authorization data has been used in a previous transaction is determined. If no, the credit authorization data is usable. If yes, duplicate payment may have occurred. Then the credit payment client can be instructed to generate new credit authorization data for the current payment transaction.

Whether an amount of the current payment transaction exceeds the credit limit is determined. If yes, the current payment transaction fails and a failure reason is returned to the credit payment client.

The above-mentioned operations can be performed in any sequence, or only one or more of the operations can be performed, or other logical judgment or processing can be performed.

Step 1409: The fee deduction client records current fee deduction.

The fee deduction record includes the amount of the current payment transaction and the credit authorization data.

The amount of the current payment transaction and the credit authorization data recorded by the fee deduction client in the present step can be stored in the POS machine. If the POS machine includes a processing device such as a computer, the current transaction amount and the credit authorization data can be stored in a disk of the computer, or another reliable memory (for example, through network backup storage).

The recorded credit authorization data can be all information included in the previously described credit authorization data, or can be user information. In the processing step of the fee deduction client, the encrypted user information is not decrypted. Only the encrypted user information is recorded to further ensure the security of the user information.

The fee deduction record can further include content such as merchant information, for example, a merchant ID, a type of the payment transaction, or merchandise information.

In this case, the current payment transaction of the user is completed. If the POS machine is corresponding to a transportation gate, the gate can be opened to allow passengers to pass through. If the POS machine is used for consumption, it can notify the merchant that the current payment is completed. The financial account of the user does not change, the payment was made by credit payment, and the POS machine of the merchant does not need to communicate with the remote server to complete fee deduction of the current payment transaction. As such, a time of the current payment transaction between the mobile phone of the user and the POS machine can greatly be shortened, and user payment efficiency can be improved.

Step 1410: The POS machine sends the fee deduction record to the remote server at a predetermined time for checking.

The POS machine can possibly record multiple deduction records in a certain period of time, and transfers the multiple deduction records each time when performing account reconciliation with the remote server. The predetermined time can be 00:00 every day in this example, and 00:00 is an idle time of the POS machine. The POS machine sends the fee deduction records to the remote server through the network (a wired or wireless network). The fee deduction record includes the user information and the payment amount described in the previous steps. The remote server decrypts the user information to obtain the user identity and the bank card number, and deducts the payment amount from the bank card account, thereby successfully completing the payment process.

Figure 15:
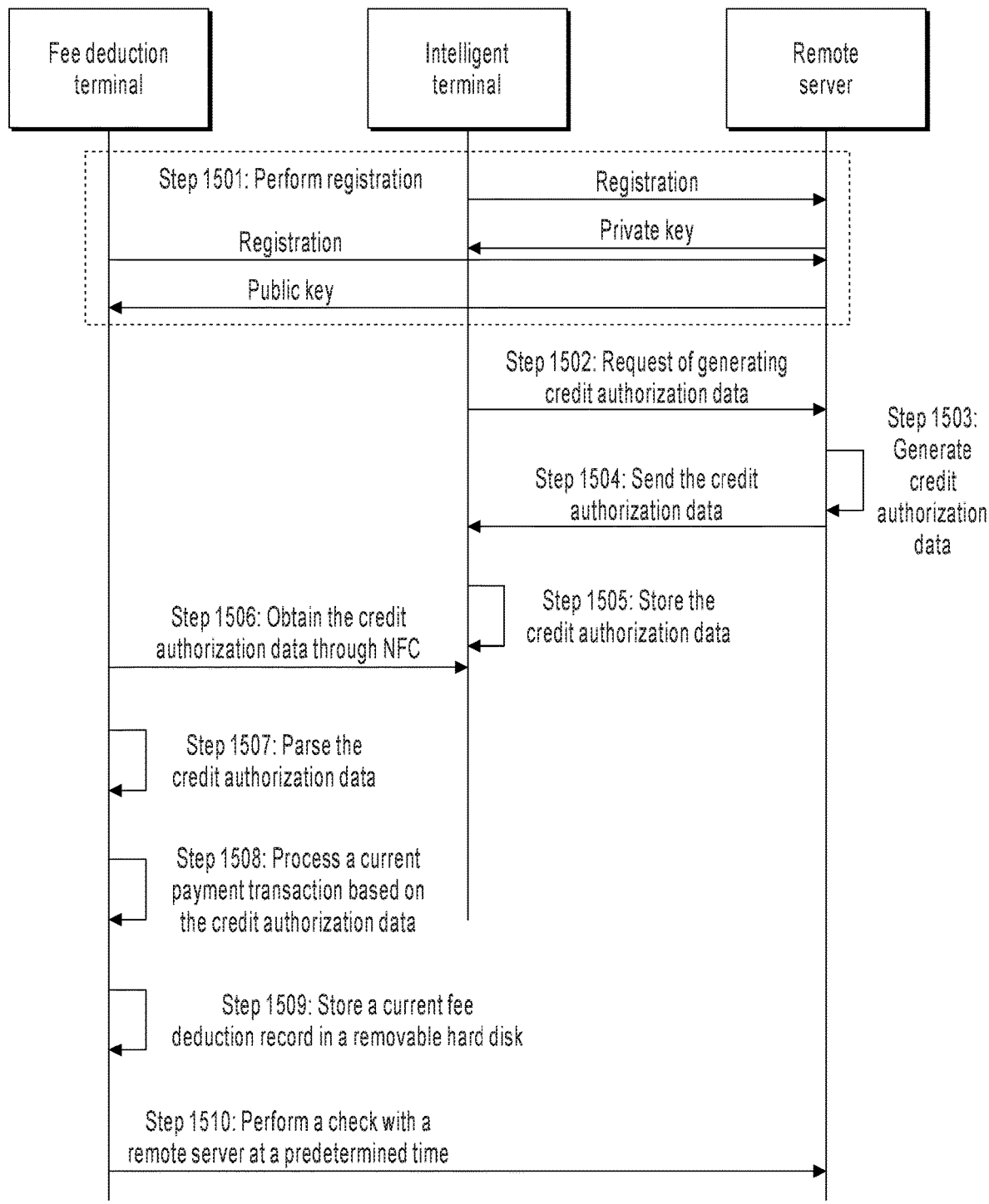
FIG. 15 is a flowchart illustrating another offline credit payment method, according to an implementation of the present application.

FIG. 15 is a flowchart illustrating another offline credit payment method, according to an implementation of the present application. A difference between the implementation in FIG. 15 and the implementation in FIG. 14 lies in that, in this implementation in FIG. 15, a credit payment client on a mobile phone sends credit authorization data to a POS machine by using an NFC communication module, instead of generating a two-dimensional barcode. Correspondingly, an NFC communication module of the POS machine in this implementation is configured to obtain the credit authorization data sent by the mobile phone. The POS machine further has a USB interface, and the USB interface is configured to store a fee deduction record in a removable memory.

Steps same as or similar to those in the implementation in FIG. 14 are not repeated here for simplicity, and only different steps are described.

Step 1505: A credit payment client of an intelligent terminal stores credit authorization data in a local memory, so that an NFC communication module can access the credit authorization data.

In an optional implementation, the intelligent terminal end does not need to obtain credit authorization data during each time of credit payment, and the credit authorization data is stored in the credit payment client of the intelligent terminal for repeated credit payment after being generated by a remote server.

Step 1506: By using an NFC communication module, a fee deduction client of a POS machine communicates with the NFC communication module of the intelligent terminal, to obtain the credit authorization data from the credit payment client.

Step 1507: The fee deduction client parses the credit authorization data obtained by using the NFC communication module.

A signature of the received credit authorization data is verified by using a public key sent by the remote server, and the credit authorization data is obtained through decryption.

Step 1508: The fee deduction client processes a current payment transaction based on the credit authorization data.

Optionally, in the present step, the fee deduction client determines whether a credit limit included in the credit authorization data satisfies current consumption. If yes, the current consumption is subtracted from the credit limit, and a remaining credit limit is returned to the mobile phone by using the NFC communication module. The credit payment client on the mobile phone changes the credit limit included in the locally stored credit authorization data to the remaining credit limit, so that the remaining credit limit is used as a new credit limit for next credit payment.

Certainly, time information included in the credit authorization data can be deleted or can be a relatively long time, so that the credit authorization data can be used for repeated credit payment.

Step 1509: The fee deduction client records current fee deduction on a removable hard disk by using a USB interface.

The fee deduction record includes an amount of the current payment transaction and the credit authorization data.

Step 1510: The POS machine sends the fee deduction record to the remote server at a predetermined time for checking.

In the method and the system in the implementations of the present application, when a user does not use a bank card for payment, the fee deduction terminal can quickly complete a fee deduction transaction without accessing a network. Credit authorization data is temporarily generated during each transaction and therefore cannot be reused. As such, financial losses incurred by an information leak can be avoided for users who use magnetic stripe bank cards in the existing technology.

For technical improvements, one can distinguish between a hardware improvement (for example, an improvement in circuit structures of a diode, a transistor, a switch, etc.) and a software improvement (an improvement in a method process). However, as technologies develop, improvements in many current method processes can be considered as a direct improvement in a hardware circuit structure. Almost all designers obtain corresponding hardware circuit structures by programming improved method processes to hardware circuits. Therefore, it cannot be said that the improvement in a method process cannot be implemented by using a hardware entity module. For example, a programmable logic device (PLD), such as a field programmable gate array (FPGA), is such an integrated circuit whose logic function is determined by programming a device by a user. A designer performs programming to "integrate" a digital system to a single PLD, without requiring a chip manufacturer to design and manufacture a dedicated integrated circuit chip 2. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. It should also be clear to a person skilled in the art that a hardware circuit of a logic method process can be easily obtained by performing logic programming on the method process through several earlier described hardware description languages and programming the method process to an integrated circuit.

A controller can be implemented in any appropriate way. For example, the controller can take the form of, for example, a microprocessor or a processor and a computer-readable medium storing computer-readable program code (such as software or firmware) that can be executed by the microprocessor or the processor, a logic gate, a switch, an application specific integrated circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A memory controller can also be implemented as a part of control logic of a memory.

A person skilled in the art also know that, in addition to implementing the controller by using the computer-readable program code, logic programming can be performed on method steps to allow the controller to implement the same function in forms of the logic gate, the switch, the programmable logic controller, the programmable logic controller, and the embedded microcontroller. Therefore, such a controller can be considered as a hardware component. An apparatus included in the controller and configured to implement various functions can be considered as a structure in the hardware component. Or, the apparatus configured to implement various functions can even be considered as both a software module implementing the method and a structure in the hardware component.

The system, apparatus, module or unit illustrated in the earlier described implementations can be implemented by a computer chip or an entity, or can be implemented by a product having a certain function.

For ease of description, the apparatus is described by dividing the functions to various units. Certainly, when the present application is implemented, the functions of all units can be implemented in one or more pieces of software and/or hardware.

It can be seen from description of the implementations that, a person skilled in the art can clearly understand that the present application can be implemented by using software in addition to a necessary universal hardware platform. Based on such an understanding, the technical solutions in the present application essentially or the part contributing to the existing technology can be implemented in a form of a software product. The software product can be stored in a storage medium, such as a ROM/RAM, a magnetic disk, or an optical disc, and includes several instructions for instructing a computer device (a personal computer, a server, or a network device) to perform the methods described in the implementations or in some parts of the implementations of the present application.

The implementations in the present specification are described in a progressive way. For same or similar parts in the implementations, reference can be made to each other. Each implementation focuses on a difference from other implementations. Particularly, a system implementation is similar to a method implementation, and therefore, is described briefly. For related parts, refer to partial descriptions in the method implementation.

The present application can be used in many general-purpose or dedicated computer system environments or configurations, for example, a personal computer, a server computer, a handheld device or a portable device, a flat panel device, a multi-processor system, a microprocessor-based system, a set-top box, a programmable consumer digital device, a network PC, a minicomputer, a mainframe computer, and a distributed computing environment including any one of the earlier described systems or devices.

The present application can be described in the general context of an executable computer instruction executed by a computer, for example, a program module. Generally, the program module includes a routine, a program, an object, a component, a data structure, etc. for executing a particular task or implementing a particular abstract data type. The present application can also be practiced in distributed computing environments. In the distributed computing environments, tasks are performed by remote processing devices that are connected through a communications network. In a distributed computing environment, the program module can be located in both local and remote computer storage media including storage devices.

The present application is described through implementations. However, a person of ordinary skill in the art knows that many modifications and variations of the present application can be made without departing from the spirit of the present application. It is intended that the claims include these modifications and variations without departing from the spirit of the present application.

Figure 16:
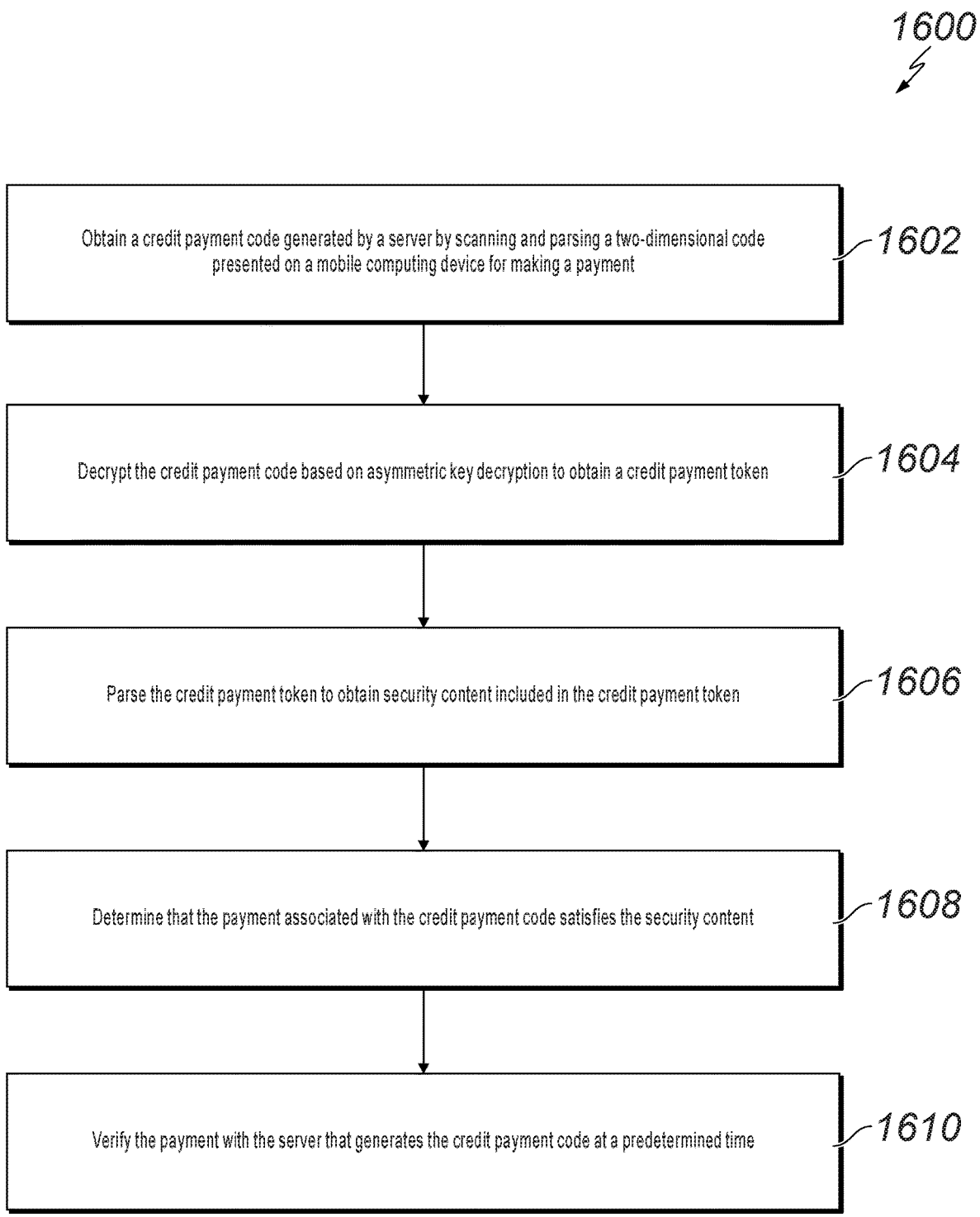
FIG. 16 is a flowchart illustrating an example of a computer-implemented method for processing a two-dimensional code for offline credit payment, according to an implementations of the present disclosure.

FIG. 16 is a flowchart illustrating an example of a computer-implemented method 1600 for processing a two-dimensional code for offline credit payment, according to an implementation of the present disclosure. For clarity of presentation, the description that follows generally describes method 1600 in the context of the other figures in this description. However, it will be understood that method 1600 can be performed, for example, by any system, environment, software, and hardware, or a combination of systems, environments, software, and hardware, as appropriate. In some implementations, various steps of method 1600 can be run in parallel, in combination, in loops, or in any order.

At 1602, a credit payment code is obtained by scanning and parsing a two-dimensional code for making a payment. A POS machine that incorporates functions to scan two-dimensional codes can be used to receive credit payments offline from a mobile computing device. The POS machine can include a scanning module or can be connected to a code scanning device to scan the two-dimensional codes. The scanned two-dimensional code can be parsed to identify the credit payment code.

The two-dimensional code can be generated by a mobile computing device based on a credit payment code generated and provided by a server. First, a user account registration can be performed by using a payment application (APP) installed on a mobile computing device. In some cases, a user can provide user identity information and payment information through the APP to the server. User identity information can include mobile phone number, IMEI, identity card number, e-mail address, or other information that can be used to verify the user's identity. Payment information can include credit card information, bank account information, or other funding sources that can be used to fund an offline credit payment. After user identity and payment account are verified, the user account is registered with the server.

A credit payment code request can be sent to the server after the user account is registered with the server. A user can request a credit payment code from the server for making payment. The credit payment code can be a pre-authorization of a payment valid for a predetermined period of time to ensure payment safety. After the server receives the credit payment request, it can verify the user's identity and generate a credit payment token. The credit payment request can include user identity information such as mobile phone number, IMEI, or other user identity information that can be used by the server to uniquely identify the user or mobile computing device that initiates the request.

The credit payment token can include security content to ensure payment safety. The security content can include transaction information and user identity information. The transaction information can include a generation time of the credit payment token and a predetermined time duration the credit payment code is valid. The predetermined time duration can be a time period that the credit payment token is valid from the generation time of the credit payment token. In some cases, the credit payment token is valid for making credit payment during the time period. In some cases, the credit payment token can expire after a single use during the time period. The security content can also include a random number generated by the server that is associated with the credit payment token. A POS machine can verify whether the random number included in the credit payment token has already been obtained. If so, the credit payment can be considered a duplicate payment and not be granted. The random number and user identity information can be sent to the POS machine to verify the legitimacy of the credit payment token and the user identity. In some cases, the security content can also include payee information. In such cases, the payee merchants authorized by the server can receive credit payment using the credit payment code. In some cases, the security content can also include payment information of the user such as a credit limit. For example, an offline credit payment can be rejected if the transaction amount exceeds the credit limit. In some cases, the credit payment token can also include user identity information to uniquely identify the user account.

The credit payment token can be digitally signed by using asymmetric key encryption to generate the credit payment code. The server can generate a private key based on the user identity information or payment information to encrypt the credit payment token. In some cases, the private key is used to encrypt part of the credit payment token. For example, a private key can be generated for the user account to sign the security content included in the credit payment token, and a public key can be used to encrypt the user identity information.

A credit payment code is received from the server, where the credit payment code includes a credit payment token encrypted using asymmetric key encryption. In some cases, the mobile computing device can save the received credit payment code. A two-dimensional (or other dimensional—such as, a three-dimensional or four-dimensional) code based on the credit payment code can be generated. For example, the two-dimensional code can be a quick response (QR) code. From 1602, method 1600 proceeds to 1604.

At 1604, the credit payment code is decrypted based on asymmetric key decryption to obtain a credit payment token. The POS machine and the user account can both be registered with the server. The server can provide a public key to the POS machine and a private key to the mobile computing device corresponding to the user account. The POS machine can use the public key to decrypt the credit payment token digitally signed by the private key. From 1604, method 1600 proceeds to 1606.

At 1606, the credit payment token is parsed to obtain security content included in the credit payment token. The credit payment token can be obtained after decrypting the credit payment code. The credit payment token can include security content to ensure payment safety. The security content can include transaction information and user identity information. The transaction information includes at least one of a generation time of the credit payment token, a predetermined time duration the credit payment code is valid, a random number corresponding to the credit payment token, the payment account information, or authorized payee information. From 1606, method 1600 proceeds to 1608.

At 1608, the payment associated with the credit payment code is determined to satisfy the security content. As such, an offline credit payment is recorded and pending execution. From 1608, method 1600 proceeds to 1610.

At 1610, the payment is verified with a server that issues the credit payment code at a predetermined time. Because the credit payment code includes security content, the POS machine does not need to verify the payment with the server when the payment is recorded. The POS can record any payment offline based on a credit payment code and all recorded payments can be verified and executed by the server at a predetermined time when the POS machine connects to the server. After 1610, method 1600 stops.

Implementations of the subject matter described in this specification can be implemented so as to realize particular advantages or technical effects. For example, implementations of the subject matter permit a POS machine to securely accept payment offline. The server receives the request and generates a credit payment token that includes security content for making an offline credit payment. The two-dimensional code generated by a mobile computing device based on an encrypted credit payment token can be scanned by a POS machine to verify and record payment information even if the POS machine is not connected to the server. Verified and recorded payments based on security content included in the two-dimensional code can be executed together when the POS machine is connected to the server. As such, mobile payments can be more efficiently performed while ensuring both data and transaction security.

The described methodology permits enhancement of various mobile computing device transactions and overall transaction/data security. Participants in transactions using mobile computing devices and POS machines can be confident that two-dimensional codes scanned provides enough security content to ensure secured offline credit payments.

Information embedded in generated two-dimensional codes can provide easily customized, multi-dimensional security measures. This feature permits higher-level security of underlying data and transactions, as committing fraud using illegitimate two-dimensional codes becomes extremely difficult or impossible (such as, with random/dynamic or time-based information). For example, information embedded in a two-dimensional code can include a random number associated with the credit payment token and an offline credit payment can be valid for only a limited period of time.

The described methodology can also ensure the efficient usage of computer resources (for example, processing cycles, network bandwidth, and memory usage), through efficient payment processing. At least these actions can minimize or prevent waste of available computer and network resources with respect to multiple parties in a mobile computing transactions by reducing network bandwidth usage between the POS machine, the mobile computing device, and the server. Instead of POS machine needing to verify data with additional communications or transactions with the server in real-time, transactions can be depended upon as valid and performed at a different time (for example, when network bandwidth usage is lower or when transactions can be performed in batches). Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   scanning, by a point-of-sale (POS) machine while offline, a two-dimensional code presented on a mobile computing device;
   parsing, by the POS machine while offline, the two-dimensional code to identify a credit payment code for making a payment associated with the credit payment code;
   decrypting, by the POS machine while offline, the credit payment code based on asymmetric key decryption to obtain a credit payment token, wherein at least part of the credit payment token is signed by a private key generated for an user account, and wherein the credit payment token comprises user identity information that is encrypted using a public key;

parsing, by the POS machine while offline, the credit payment token to obtain security content included in the credit payment token, wherein the security content comprises transaction information, the user identity information that is encrypted using the public key, and one or more random numbers corresponding to the credit payment token;

determining, by the POS machine while offline, that the payment associated with the credit payment code satisfies the security content, comprising determining that the one or more random numbers have not been included in previous payments and recorded by the POS machine;

in response to determining that the payment associated with the credit payment code satisfies the security content, accepting, by the POS machine, the payment offline; and after accepting the payment offline, connecting, by the POS machine, to a server for verification and execution of the payment by the server at a predetermined time.

2. The computer-implemented method of claim 1, wherein the transaction information includes at least one of a generation time of the credit payment token, a predetermined time duration the credit payment code is valid, payment account information, or authorized payee information.

3. The computer-implemented method of claim 2, wherein the user identity information is encrypted using the public key different from a second public key that decrypts the credit payment token, and wherein the transaction information is encrypted using the private key, and wherein decrypting, by the POS machine while offline, the credit payment code based on the asymmetric key decryption to obtain the credit payment token comprises decrypting the transaction information using the second public key and keeping the user identity information encrypted.

4. The computer-implemented method of claim 1, wherein determining that the payment associated with the credit payment code satisfies the security content further includes determining the credit payment code is obtained at a point-in-time within a predetermined time duration, and wherein the predetermined time duration begins at generation of the credit payment token.

5. The computer-implemented method of claim 1, wherein the two- dimensional code is valid for offline payment use for a predetermined number of times.

6. The computer-implemented method of claim 1, further comprising:

registering the POS machine to the server before obtaining the credit payment code; and receiving the public key from the server for decrypting the credit payment code.

7. The computer-implemented method of claim 3, further comprising recording a credit payment after determining that the payment associated with the credit payment code satisfies the security content;

recording information associated with the decrypted transaction information and the encrypted user identity information; and sending the recorded information to the server.

8. A non-transitory, computer-readable medium storing one or more instructions executable by a computer system to perform operations comprising:

scanning, by a point-of-sale (POS) machine while offline, a two-dimensional code presented on a mobile computing device;

parsing, by the POS machine while offline, the two-dimensional code to identify a credit payment code for making a payment associated with the credit payment code;

decrypting, by the POS machine while offline, the credit payment code based on asymmetric key decryption to obtain a credit payment token, wherein at least part of the credit payment token is signed by a private key generated for an user account, and wherein the credit payment token comprises user identity information that is encrypted using a public key;

parsing, by the POS machine while offline, the credit payment token to obtain security content included in the credit payment token, wherein the security content comprises transaction information, the user identity information that is encrypted using the public key, and one or more random numbers corresponding to the credit payment token;

determining, by the POS machine while offline, that the payment associated with the credit payment code satisfies the security content, comprising determining that the one or more random numbers have not been included in previous payments and recorded by the POS machine;

in response to determining that the payment associated with the credit payment code satisfies the security content, accepting, by the POS machine, the payment offline; and after accepting the payment offline, connecting, by the POS machine, to a server for verification and execution of the payment by the server at a predetermined time.

9. The non-transitory, computer-readable medium of claim 8, wherein the transaction information includes at least one of a generation time of the credit payment token, a predetermined time duration the credit payment code is valid, payment account information, or authorized payee information.

10. The non-transitory, computer-readable medium of claim 9, wherein the user identity information is encrypted using the public key different from a second public key that decrypts the credit payment token, and wherein the transaction information is encrypted using the private key, and wherein decrypting, by the POS machine while offline, the credit payment code based on the asymmetric key decryption to obtain the credit payment token comprises decrypting the transaction information using the second public key and keeping the user identity information encrypted.

11. The non-transitory, computer-readable medium of claim 8, wherein determining that the payment associated with the credit payment code satisfies the security content further includes determining the credit payment code is obtained at a point-in-time within a predetermined time duration, and wherein the predetermined time duration begins at generation of the credit payment token.

12. The non-transitory, computer-readable medium of claim 8, wherein the two-dimensional code is valid for offline payment use for a predetermined number of times.

13. The non-transitory, computer-readable medium of claim 8, wherein the operations further comprise:

registering the POS machine to the server before obtaining the credit payment code; and receiving the public key from the server for decrypting the credit payment code.

14. The non-transitory, computer-readable medium of claim 10, wherein the operations further comprise:
recording a credit payment after determining that the payment associated with the credit payment code satisfies the security content;
recording information associated with the decrypted transaction information and the encrypted user identity information; and
sending the recorded information to the server.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
scanning, by a point-of-sale (POS) machine while offline, a two-dimensional code presented on a mobile computing device;
parsing, by the POS machine while offline, the two-dimensional code to identify a credit payment code for making a payment associated with the credit payment code;
decrypting, by the POS machine while offline, the credit payment code based on asymmetric key decryption to obtain a credit payment token, wherein at least part of the credit payment token is signed by a private key generated for an user account, and wherein the credit payment token comprises user identity information that is encrypted using a public key;
parsing, by the POS machine while offline, the credit payment token to obtain security content included in the credit payment token, wherein the security content comprises transaction information, the user identity information that is encrypted using the public key, and one or more random numbers corresponding to the credit payment token;
determining, by the POS machine while offline, that the payment associated with the credit payment code satisfies the security content, comprising determining that the one or more random numbers have not been included in previous payments and recorded by the POS machine;
in response to determining that the payment associated with the credit payment code satisfies the security content, accepting, by the POS machine, the payment offline; and
after accepting the payment offline, connecting, by the POS machine, to a server for verification and execution of the payment by the server at a predetermined time.

16. The computer-implemented system of claim 15, wherein the transaction information includes at least one of a generation time of the credit payment token, a predetermined time duration the credit payment code is valid, payment account information, or authorized payee information.

17. The computer-implemented system of claim 16, wherein the user identity information is encrypted using the public key different from a second public key that decrypts the credit payment token, and wherein the transaction information is encrypted using the private key.

18. The computer-implemented system of claim 15, wherein determining that the payment associated with the credit payment code satisfies the security content further includes determining the credit payment code is obtained at a point-in-time within a predetermined time duration, and wherein the predetermined time duration begins at generation of the credit payment token.

19. The computer-implemented system of claim 15, wherein the two-dimensional code is valid for offline payment use for a predetermined number of times.

20. The computer-implemented system of claim 15, wherein the one or more operations further comprise:
registering the POS machine to the server before obtaining the credit payment code; and
receiving the public key from the server for decrypting the credit payment code.

\* \* \* \* \*